United States Patent
Inha

(10) Patent No.: US 10,627,018 B2
(45) Date of Patent: Apr. 21, 2020

(54) PIPE MOUNT

(71) Applicant: Uponor Innovation AB, Virsbo (SE)

(72) Inventor: Teemu Inha, Järvenpää (FI)

(73) Assignee: Uponor Innovation AB, Virsbo (SE)

(*) Notice: Subject to any disclaimer, the term of this patent is extended or adjusted under 35 U.S.C. 154(b) by 314 days.

(21) Appl. No.: 15/459,222

(22) Filed: Mar. 15, 2017

(65) Prior Publication Data
US 2017/0268703 A1    Sep. 21, 2017

(30) Foreign Application Priority Data

Mar. 15, 2016 (EP) .................. 16160460

(51) Int. Cl.
| | | |
|---|---|---|
| *F16L 1/09* | (2006.01) | |
| *F16L 5/00* | (2006.01) | |
| *F16L 1/10* | (2006.01) | |
| *E04F 17/00* | (2006.01) | |
| *E04C 2/52* | (2006.01) | |
| *E04B 2/74* | (2006.01) | |
| *B23K 37/053* | (2006.01) | |
| *E04B 1/38* | (2006.01) | |
| *F16L 37/00* | (2006.01) | |
| *E03C 1/01* | (2006.01) | |

(52) U.S. Cl.
CPC ............ *F16L 5/00* (2013.01); *B23K 37/0533* (2013.01); *E04B 1/38* (2013.01); *E04B 2/7453* (2013.01); *E04C 2/526* (2013.01); *E04F 17/00* (2013.01); *F16L 1/09* (2013.01); *F16L 1/10* (2013.01); *F16L 37/008* (2013.01); *E03C 1/01* (2013.01)

(58) Field of Classification Search
CPC .......... B23K 37/0533; F16L 1/09; F16L 1/10; F16L 37/008
USPC ..................................... 285/64, 302
See application file for complete search history.

(56) References Cited

U.S. PATENT DOCUMENTS

| | | | | |
|---|---|---|---|---|
| 1,112,814 A | * | 10/1914 | Lowe ........................ | F16L 3/00 285/64 |
| 1,632,206 A | * | 6/1927 | Tolman, Jr. ................ | F23J 1/00 285/64 |
| 2,314,408 A | * | 3/1943 | Knight .................... | H02G 3/083 285/64 |
| 2,372,707 A | * | 4/1945 | Blome .................... | E04F 17/02 138/106 |
| 3,014,222 A | * | 12/1961 | Pope ..................... | E03D 11/143 285/64 |

(Continued)

FOREIGN PATENT DOCUMENTS

| | | |
|---|---|---|
| DE | 1658246 | 12/1971 |
| DE | 29505855 U1 | 6/1995 |

(Continued)

*Primary Examiner* — David Bochna
(74) *Attorney, Agent, or Firm* — Occhiuti & Rohlicek LLP

(57) ABSTRACT

A pipe mount for connecting pipe sections is disclosed. The pipe mount comprises a sliding member movably attached to a plumbing arrangement element. The sliding member extends in the vertical direction of the plumbing arrangement element, and it is vertically movable between an extreme position and a second position. The pipe mount further comprises at least one pipe bracket for securing the pipe sections onto the sliding member. A system and a method for connecting pipe sections are also disclosed.

15 Claims, 4 Drawing Sheets

(56) References Cited

U.S. PATENT DOCUMENTS

| | | | | | |
|---|---|---|---|---|---|
| 3,014,223 | A | * | 12/1961 | Pope | E03D 11/143 |
| | | | | | 285/64 |
| 4,076,281 | A | * | 2/1978 | Davis | F16L 3/00 |
| | | | | | 285/64 |
| 4,329,973 | A | * | 5/1982 | Scullin, Jr. | F24B 1/1806 |
| | | | | | 126/318 |
| 4,346,740 | A | * | 8/1982 | Williams | F16L 59/22 |
| | | | | | 285/55 |
| 4,638,829 | A | * | 1/1987 | Cornwall | F16L 5/04 |
| | | | | | 285/64 |
| 4,846,147 | A | * | 7/1989 | Townsend | F23J 13/02 |
| | | | | | 285/424 |

FOREIGN PATENT DOCUMENTS

| | | |
|---|---|---|
| FR | 2573461 | 5/1986 |
| FR | 2571768 | 8/1986 |

* cited by examiner

PIPE MOUNT

RELATED APPLICATION

This application claims priority to European Application No. 16160460.8 filed on Mar. 15, 2016, the contents of which are hereby incorporated by referenced in their entirety.

FIELD OF THE INVENTION

The present invention relates generally to a pipe mount. In particular, the present invention relates to a spring-loaded pipe mount for connecting and installing water pipes in prefabricated plumbing arrangement elements to form a continuous vertical pipeline.

BACKGROUND OF THE INVENTION

Historically, the sanitary spaces, i.e. bathrooms, lavatories or washrooms, of buildings with several floors and several apartments have water and sewage installations arranged into vertical shafts running inside structural walls, and into horizontal lines inside the floor/ceiling structures between the floors. In other words, the pipes and other conducting elements for water and sewage installations are embedded within structures of stone, concrete, tile or other such building material. At the time renovations, when the water and sewage installations need to be replaced, costly and time-consuming cutting-in operations are needed to access the pipes.

In newer buildings, as well as when the wet spaces of older buildings are renovated, modern constructions rules and building codes may require that all such pipelines must be installed so that they are accessible for maintenance, repair and future renovations without breaking the wall or floor/ceiling structures of the building. For example, water conduits leading fresh water from a mains line to a shower, a toilet or a washbasin must be surface-installed on the walls. Naturally, there are lead-through points for the pipes between floors and walls. In addition, modern building codes have strict requirements for wet sealing and water proofing, i.e. providing water barrier membranes that are continuous within a sanitary space, as well constructions that allow possible leaks to be detected by leading the leaking water/liquid outside any closed structures where they become visible.

These kinds of installations are time-consuming and require great precision from the persons conducting the installations, to avoid any mistakes that could lead to water or moisture damages within the sanitary space or building structures.

To avoid the above-mentioned problems, different prefabricated sanitary room installation assemblies or plumbing arrangement elements have been introduced to partially replace on-site installation, especially in new buildings but also in renovation projects.

The plumbing arrangement elements are intended to be installed in a vertical line in each vertically successive or adjoining sanitary space of a building to form continuous vertical pipelines for all the necessary plumbing and other conducting elements. The plumbing arrangement elements usually comprise a cassette or cabinet with at least part of the plumbing, piping, insulation and their connecting points pre-installed within the cassette casing at a factory by experts, thus eliminating the need of on-site precision work and avoiding possible installation mistakes.

The current solutions, however, require a certain amount of skilled work in aligning the vertical lines of pipes and other conducting elements, leading them through the floor structures between two vertically adjoining sanitary spaces, and connecting the pipelines. Especially when the on-site personnel is not used to working with such installation assemblies, problems may arise. For example, aligning water pipes through floor structures may be challenging.

Normally, the prefabricated plumbing arrangement element and the pipes within are considerably shorter than the floor-to-ceiling height of the space. When installing the plumbing arrangement element, the personnel need to connect the pipes of two vertically adjoining spaces by supplying connecting pipe sections between the preinstalled pipes, accomplish all required connections and install other elements such as insulation and casings, often in very confined and ergonomically difficult spaces.

OBJECTIVE OF THE INVENTION

The objective of the invention is to provide an improved pipe mount for mounting pipes of prefabricated plumbing arrangement elements.

In particular, it is an objective of the present invention to provide a pipe mount that ensures an easy, fast and secure way of mounting and connecting successive pipes into a pipeline for on-site installations in sanitary space constructions or renovations.

The pipe mount is particularly intended to be used in connection with plumbing arrangement elements that are installed in a vertically aligned line in several sanitary spaces or units arranged on top of each other, for example in an apartment building or block of flats with several floors. Further, the pipe mount is particularly intended to be used with pre-insulated water pipes in which the pipe connection is achieved with fittings with which a pipe joint may be formed without any external tools.

SUMMARY OF THE INVENTION

This summary is provided to introduce a selection of concepts in a simplified form that are further described below in the part "Detailed description". This summary is not intended to identify key features or essential features of the claimed subject matter, nor is it intended to be used to limit the scope of the claimed subject matter.

According to an aspect of the invention, the present invention provides a pipe mount for connecting a first pipe section of a first plumbing arrangement element to a second pipe section of a second plumbing arrangement element to form a continuous vertical pipeline, the pipe mount arranged inside the plumbing arrangement element. The pipe mount comprises a sliding member configured to be movably attached to the plumbing arrangement element, the sliding member configured to extend in the vertical direction of the plumbing arrangement element, and the sliding member configured to be vertically movable between an extreme position and a second position; and at least one pipe bracket extending horizontally from the sliding member, the at least one pipe bracket configured to secure the first pipe section onto the sliding member, the first pipe section configured to extend vertically from a bottom part of the plumbing arrangement element to a top part of the plumbing arrangement element.

In an embodiment of the invention, the pipe mount further comprises at least one elastic member configured to load the pipe mount when vertically moving the sliding member from the extreme position to the second position.

In an embodiment of the invention, the elastic element is a spring comprising at least one of the following: a tension spring, or a compression spring.

In an embodiment of the invention, the first pipe section comprises at least one first fitting.

In an embodiment of the invention, a connecting pipe is configured to be connected to the first pipe section via the first fitting.

In an embodiment of the invention, the second pipe section comprises at least one second fitting.

In an embodiment of the invention, the connecting pipe is configured to be connected to the second pipe section via the second fitting so that a continuous vertical pipeline comprising the first pipe section, the connecting pipe and the second pipe section, is formed.

In an embodiment of the invention, the first pipe section and the second pipe section comprise pre-insulated pipe with an insulation layer.

In an embodiment of the invention, the first fitting and the second fitting are configured to be at least partially embedded into the insulation layer.

In an embodiment of the invention, the at least one pipe bracket is configured to be at least partially embedded into the insulation layer.

In an embodiment of the invention, the sliding member is configured to be immovably securable onto the plumbing arrangement element with a fastener.

In another aspect of the invention, a plumbing system is disclosed. The plumbing system comprises a first plumbing arrangement element comprising first pipe sections and a second plumbing system arrangement disposed above the first plumbing arrangement element comprising second pipe sections connectable to the first pipe sections of the first plumbing arrangement with connecting pipes. At least the first plumbing arrangement element comprises at least one pipe mount according to any one of the embodiments disclosed herein for connecting the first pipe sections to the second pipe sections.

In an embodiment of the system, the plumbing arrangement elements are prefabricated elements.

In another aspect of the invention, a method for connecting at least one first pipe section of a first plumbing arrangement element disposed in a first space to a at least one second pipe section of a second plumbing arrangement element disposed in a second space to form at least one continuous vertical pipeline is disclosed. The method comprises leading at least one connecting pipe through at least one lead-trough channel arranged into a floor structure disposed between the first and second spaces; connecting the at least one connecting pipe to the at least one first pipe section to form a pipeline; mounting the first plumbing arrangement element in place; and at the same time inserting the at least one connecting pipe to the at least one second pipe section; connecting the at least one connecting pipe to the at least one second pipe section with a pipe mount according to any one of the embodiments disclosed herein.

In an embodiment of the method, the at least one second pipe section comprises a second fitting, and the connecting pipe is connected to the second pipe section via the second fitting.

In an embodiment of the method, a secure connection between the connecting pipe and the second pipe section is formed by aligning the connecting pipe with the second pipe section by vertically moving the pipe mount from an extreme position to a second position; inserting the connecting pipe into the second fitting by vertically moving the pipe mount a distance; vertically moving the pipe mount back towards the extreme position; and thereby forcing the connecting pipe further into the second fitting so that a connecting mechanism of the second fitting is set off, and the connection formed.

In an embodiment of the method, it further comprises fixing the vertical pipeline immovably in place after the required connections have been formed, by securing the pipe mount onto a sidewall of the first plumbing arrangement element.

The technical effect of the invention is that due to the pipe mount disclosed herein, pipe sections may be connected in a simple and time-saving manner while mounting plumbing arrangement elements in place. The prefabricated plumbing arrangement element may be configured in such a way that the installing personnel may not be able to reach some of the pipes inside it due to other pipes and their insulation being in the way. Therefore it is necessary to be able to move thus unreachable pipe section with a system that is preferably external to the plumbing arrangement element, in order for the installing personnel to be able to make all the necessary connections between pipe sections of two adjoining spaces.

The installation work that needs to be done above the plumbing arrangement element—completing different pipe connections, installing insulation, near the ceiling level is difficult due to the high location, lack of space leading to poor tool clearances and cramped work space, and poor visibility. All these factors may lead to installation error which, in turn, may lead to leaks or other problems later on.

The fittings enable fast and simple pipe connections to be completed without external tools, reducing and simplifying on site plumbing work and, at the same time, reducing risks of installation errors. Pre-insulated pipes can be extended all the way to a ceiling level, thus reducing the amount on insulation work needed on site.

The pipe mount may be arranged into a prefabricated plumbing arrangement element which comprises all the necessary pipe sections, their insulation and connecting points. On site installation time is reduced, the installing personnel need not worry about tolerances as much as with separate plumbing pieces, the installation surface area can be minimized and overall quality of water and sewage installation improved.

By lead-through herein is meant generally the connection or joint between two separate spaces one of which is located wholly or partially above the other, the connection extending from the ceiling of the space below to the floor level of the space above, and extending through the floor structure between the two spaces.

By pipeline and pipe herein is meant any extended conduit or conducting line, comprising several individual pieces of pipe connected to each other to form a conducting line, including but not limited to tap water pipes, grey water pipes and sewage pipes. The two terms pipe and pipeline may be used interchangeably throughout this disclosure.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
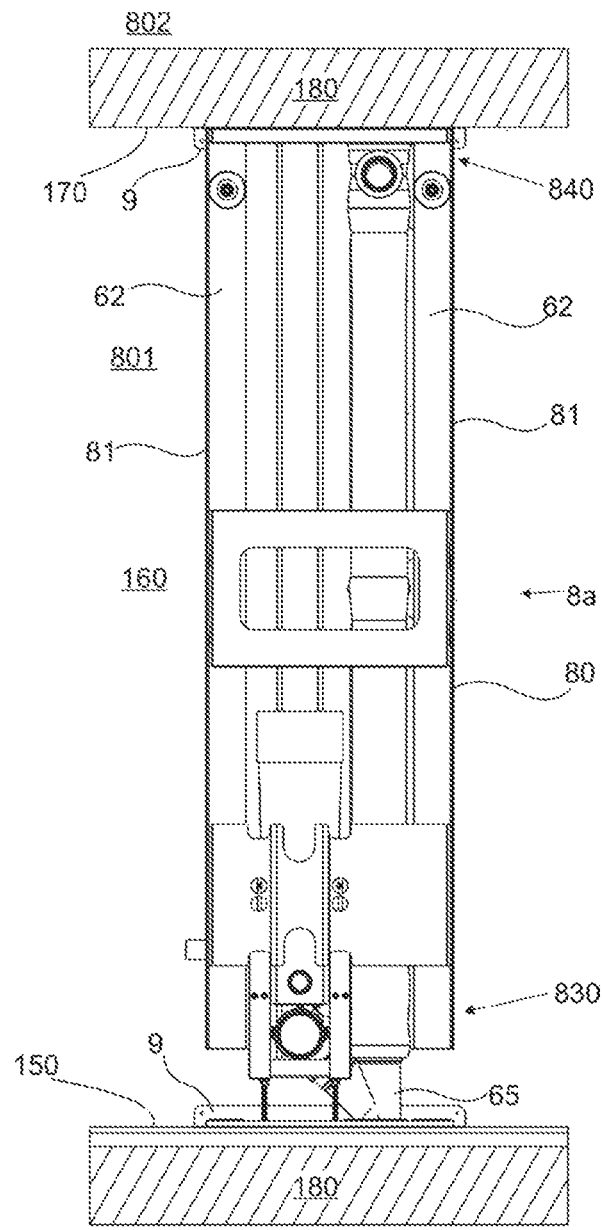
FIG. 1 is a front view of a plumbing arrangement element according to an embodiment.

A plumbing arrangement element 8a in FIG. 1, shown as a front view, comprises a vertical support structure 80 having sidewalls 81, a back wall and a detachable front cover panel (the latter two are not shown in FIG. 1), all extending in the vertical direction of the space 801, i.e. from a floor 150 or the vicinity of the floor 150 towards a ceiling 170. The plumbing arrangement element 8a comprises a bottom part 830 disposed above and adjacent to a floor 150 of the space 801, and a top part 840 disposed below and adjacent to a ceiling 170 of the space 801.

The plumbing arrangement element 8a may have different pipe sections and connections preinstalled inside the plumbing arrangement element 8a and inside the vertical support structure 80, into an interior space defined by the walls 81, 83 and the floor 150 and ceiling 170. For example, the plumbing arrangement element 8a may comprise for example pre-insulated pipes 62 such as multilayer composite pipes (MLCP) for conducting hot and cold water and heating water, and a waste water conduit or pipe 65.

The plumbing arrangement element 8a may be mounted against a wall 160 of the space 801 by mounting the vertical support structure 80 stationarily against the wall 160 using suitable means. The plumbing arrangement element 8a extends from the floor 150 and a lower floor structure 180 to a ceiling 170 and an upper floor structure 180, and it may be additionally mounted or supported onto the ceiling 170 using suitable means. Lead-through elements 9 may be utilized to lead the different pipes 62, 65 through the floor structure 180, to be connected into the corresponding pipes in a second plumbing arrangement 8b (not shown in FIG. 1) element in a vertically adjoining space 802, in order to form continuous vertical pipelines.

Figure 2A:
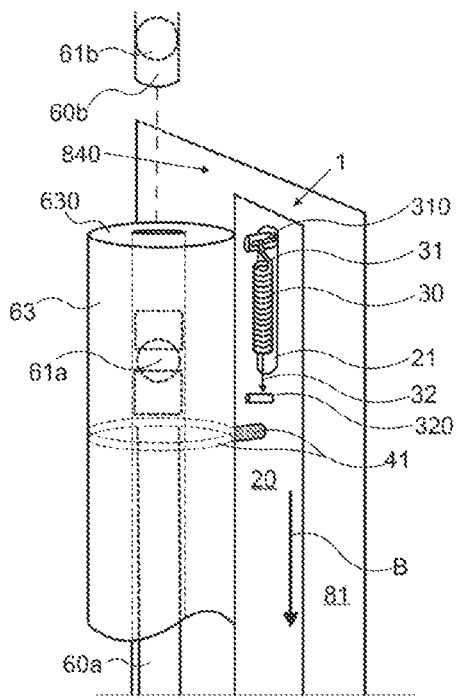
FIG. 2a shows a schematic view of a pipe mount according to an embodiment in one position.
Figure 2A:
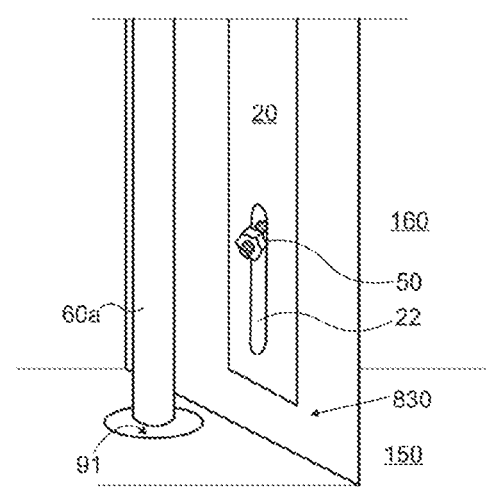
Figure 2B:
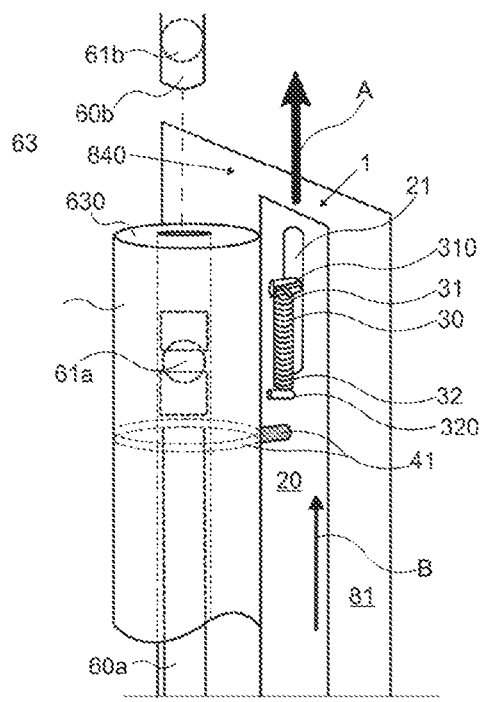
FIG. 2b shows the same schematic view of a pipe mount according to an embodiment in another position.
Figure 2B:
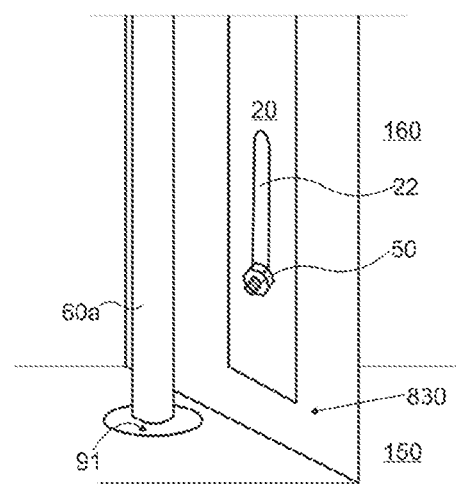

In order to facilitate the connecting and joining of the water pipe segments in the two vertically adjoining spaces 801, 802, a pipe mount 1 may be utilized. In FIGS. 2a and 2b, schematic presentations of an embodiment of the pipe mount 1 is shown, in two different vertical positions. The pipe mount 1 comprises an elongated sliding member 20 extending in the vertical direction of the plumbing arrangement element 8a. In an embodiment, the sliding member 20 may extend from the bottom part 830 to the top part 840. In an embodiment, the sliding member may extend from the top part 840 towards the bottom part 830 of the plumbing arrangement element 8a. In one embodiment, the sliding member may extend from the bottom part 830 towards the top part 840.

The moving member 20 further comprises one or more elongated openings 21, 22. The moving member 20 may for example be a strip of sheet metal or plastic. In an embodiment, the moving member 20 may be a strip of sheet metal having a thickness of 1 mm and a width of 30 mm and a length of 1500 mm. The dimensions of the moving member depend on its placement inside the vertical support structure 80 of the plumbing arrangement element 8a, as well as on the type of pipe the pipe mount 1 is arranged to support. The thickness may vary for example between 1-3 mm, and the width between 20-50 mm, and the length between 400-2000 mm. The moving member 20 may be a planar strip of sheet metal, or it may comprise a profiled strip. It may also be an edged flat metal strip.

The pipe mount 1 is arranged inside the plumbing arrangement element 8a, i.e. into the interior of the vertical support structure 80. The pipe mount 1 may be arranged straight onto the sidewalls 81, the back wall, or the front cover panel, at any suitable free or open space of the interior of the plumbing arrangement element 8a or surface of the vertical support structure 80.

In an embodiment the pipe mount 1 may be arranged onto the interior side of the sidewalls 81 or any other suitable free space in the interior side of the vertical support element 80 of the plumbing arrangement element 8a. For example, one or more pipe mounts 1 may be arranged straight onto one or both sidewalls 81, depending on the number of first pipe sections 60a to be connected into vertical pipelines. In one embodiment, the pipe mount 1 may be arranged straight onto the back wall of the plumbing arrangement element 8a.

In another embodiments, the pipe mount may be arranged into the interior of the vertical support structure 80 via intermediary retainers such as angle irons, secured into the sidewalls 81 or other parts of the vertical support element 80 from their first end, and extending into any suitable free space within the vertical support structure 80, the pipe mount 1 secured onto a second end of the intermediary retainers. There may be several such intermediary retainers along the length of the pipe mount 1, depending on the length of the pipe mount 1, the type of pipe the pipe mount 1 is designed to retain, and placement of the pipe mount 1 inside the plumbing arrangement element 8a.

The placement of the pipe mount may be for example between any two adjacent pipe sections, or any other place where there is suitable free space for the pipe mount 1 to extend as required, and suitable free space for the securing of the pipe mount 1 to some retaining surface of the vertical support system 80.

Pipe sections 60a, 60b may be for example MLC pipes, cross-linked polyethylene (PEX) pipes or copper pipes, encased in an insulation layer 63 to form pipes such as the pre-insulated pipe 62 shown in FIG. 1. The pipe sections 60a, 60b may also be insulated waste water pipes, pressurized waste water pipes or gas pipes.

The pipe mount 1 further comprises one or more pipe brackets 41 with which the first pipe section 60a may be fixed on the sliding member 20. The first pipe section 60a is arranged to extend from the bottom part 830 to the top part 840 of the first plumbing arrangement element 8a. The first pipe section 60a may be pre-insulated with the insulation layer 63, and the pipe bracket 41 embedded or partially embedded into the insulation layer 63 (in FIG. 2, the first pipe section 60a is shown with only a part of the insulation layer 63 visible so as to depict the other parts of the pipe mount 1 more clearly). The insulation layer 63 has a horizontal top plane 630 which, when the plumbing arrangement element 8a is mounted on place and the pipe sections 60a, 60b connected, is pressed tightly against the ceiling 170.

The type and number of pipe brackets 41 depend on the type of pipe and insulation chosen. The pipe bracket 41 may be any suitable pipe attachment device known in the industry, for example a pipe clamp with or without a damping ring, or a bracket. FIG. 2 shows only one pipe bracket 41, but it is to be understood that there may be several pipe brackets 41 arranged at suitable points along the length of the pipe section 60a, each pipe bracket fixed onto the sliding member 20. In an embodiment, there may be three pipe brackets 41 to support the length of the first pipe section 60a to the pipe mount 1. In other embodiments, there may be 2, 4, 5 or 6 pipe brackets 41.

The first pipe section 60a comprises a fitting 61a at or near its upper head (the end of the pipe section 60a located at or near the top part 840 of the plumbing arrangement element 8a). The first fitting 61a may submerged or embedded or partially embedded into the insulation layer 63. An opening may be arranged into the insulation layer 63 at the location of the first fitting 61a to allow a line of vision into the fitting so that the installing personnel may verify that a proper connection between different pipe sections have been formed.

The first fitting 61a may be any kind of suitable pipe fitting. Preferably, the first fitting 61a may be a push-fit connector, fitting or coupling, for example such as a ring-tension memory (RTM) fitting, a snap fit connector a press-fit connector or a sliding sleeve connector. With the first fitting 61a, a connection between the first pipe section 60a and a connecting pipe 600 (not shown in FIG. 2) may be formed without any tools.

A push-fit connector, fitting or coupling by definition in general means a fitting where the joint between two pipes or pipe sections may be done by pushing the end of one pipe or pipe section to a fitting arranged at the end of another pipe or pipe section. The fitting or coupling may comprise a socket for receiving the end of one pipe, and means for making a joint between the two pipes or pipe sections, i.e. means for achieving a seal or sealed connection between the two pipes or pipe sections. This may be for example a sealing ring, or a number of such sealing rings, or a sealing tube, made of elastic material. The fitting may further comprise means for preventing removing the pipes or pipe sections from each other and preventing the thus formed connection. These means may for example comprise different gripping members such as compression rings, or clipping rings with connecting claws or such, or clamping rings.

For example, in an RTM fitting the coupling between two pipes or pipe sections is achieved by arranging a pre-tensioned compression ring as a connecting mechanism into the fitting. It enables attaching a pipe into the fitting by inserting one end of the connecting pipe so far as to setting off tension of the compression ring which then, by striving to returning to its original form, induces and maintains even pressure around the composite pipe to form a watertight joint.

In the present invention, the first pipe section 60a may comprise another similar fitting arranged at or near its lower head (the end of the pipe section 60a located at or near the bottom part 830 of the plumbing arrangement element 8a) to form a further connection with another pipe section of another plumbing arrangement element located below the first plumbing arrangement element 8a in a lower space.

A second pipe section 60b of a plumbing arrangement element 8b of the adjoining second space 802 (not shown in FIG. 2), to which the first pipe section 60a is connected with the connecting pipe during the installation of the vertical pipeline, comprises a similar second fitting 61b at or near its lower head (the start of the pipe section 60b located at or near the bottom part of the plumbing arrangement element). Similarly to the first pipe section 60a, also the second pipe section 60b may have another similar fitting at or near its upper head (the end of the pipe section 60b located at or near the top part 840 of the plumbing arrangement element 8b) to form a further connection with another pipe section of another plumbing arrangement element located above the second plumbing arrangement element 8b, in an upper space.

The sliding member 20 may be movably attached onto the plumbing arrangement element 8a, for example onto the sidewall 81, the back wall, the front cover panel, or onto suitable placed intermediary retainers arranged onto the above-mentioned surfaces, as explained earlier in connection with the attachment of the pipe mount 1 in general, with one or more sliding elements (not shown) arranged at or onto the backside of the sliding member 20 and onto the adjacent part of the sidewall 81, the back wall, the front cover panel, or onto the intermediary retainers, so that whole of the pipe mount 1 may be moved up and down in the vertical direction, illustrated by arrow B. The pipe mount 1 may be moved from an extreme position in the vertical direction (FIG. 2b) to second position (FIG. 2a) along the vertical path of movement along the vertical direction represented by arrow B, for example to load the pipe mount 1 as explained later on.

In an embodiment (depicted in FIGS. 2a and 2b, the extreme position may be the uppermost position of the pipe mount 1 in the vertical direction; the uppermost position being the position where the pipe mount 1 is at an uppermost or ultimate position on its path of movement along the vertical direction of the sidewall 81. In that case, the pipe mount 1 may be moved from the extreme position downwards to the second position which is a lower position along the vertical direction B. This kind of movement is required when the plumbing arrangement elements 8a, 8b and the pipelines are installed in place from top of a building downwards.

In one embodiment, the extreme position may be the lowermost position of the pipe mount 1 in the vertical direction; the lowermost position being the position where the pipe mount 1 is at a lowermost or ultimate position on its path of movement along the vertical direction. In that case, the pipe mount 1 may be moved from the extreme position upwards to the second position which is an upper position along the vertical direction B. This kind of movement is required when the plumbing arrangement elements 8a, 8b and the pipelines are installed in place from bottom of a building upwards.

The pipe mount 1, at the extreme position, once the plumbing arrangement element 8a is mounted in place, forces the connecting pipe 600 into the second fitting 61b of the second pipe section 60b at a force sufficient to set off the connecting mechanism of the fitting 61b, as explained above.

In one embodiment, the sliding element may, for example, be a slide pin extending towards the sidewall 81 from the backside of the sliding member 20 into an elongated groove arranged onto the sidewall 81. In an embodiment, the sliding element may comprise a slide rail with a slider arranged onto the backside of the sliding member 20 and a counterpart arranged on to the sidewall 81. One or more sliding elements may be fixed on the back side of the sliding member 20 and the counterpart on the side wall 81. Alternatively, the sliding member may act as the slider and the counterpart may be fixed on the sidewall 81. Any suitable sliding element may be used to mount the pipe mount 1 slidingly in place inside the vertical support structure 80.

The pipe mount 1 may further comprise one or more elastic members 30 for loading the pipe mount 1. The elastic member 30 may be for example a spring comprising a compression spring or a tension spring, or any other suitable component having the required elastic properties, such as a rubber band. FIGS. 2a and 2b show one elastic member 30 located near the top part 840, but it is to be understood that there may be several such elastic members 30 along the length of the pipe mount 1 in the vertical direction, at suitable locations. In an embodiment, two elastic members 30 are arranged along the length of the pipe mount 1, one elastic member 30 being located near the top part 830, and the other below it at a suitable height. In other embodiments, there may be three elastic members 30, or four elastic members 30 arranged in appropriate locations along the vertical direction on the sliding member 20. In these kinds of embodiments, the pipe mount 1 is a spring-loaded pipe mount 1.

The type and number of elastic members 30 may depend on the type of pipes 60a, 60b, 62 and the type of insulation 63. Further, the type and number of elastic members 30 needs to be selected so that a suitable spring load may be achieved for each pipe installation in question, in order to create a sufficient upwards-oriented force, illustrated by arrow A, for push-fitting or press-fitting the pipe section 61a and a connecting pipe 600 fitted into the first fitting 61a into the second fitting 61b of the second pipe section 60b in the plumbing arrangement element 8b of the vertically adjoining space 802.

With the spring member 30, by moving the pipe mount 1 downwards or upwards from the extreme position a suitable length along the vertical direction B by sliding the sliding member 20 (as shown in FIG. 2a), the pipe mount 1 may be tensioned or loaded. In other words, the pipe mount 1 is brought either from its highest vertical position along the vertical direction B to a position lower than the uppermost extreme position, or from its lowest vertical position in the vertical direction B to a position higher than the lowermost extreme position. The length of the sliding movement achievable depends on the desired spring load needed.

In an embodiment, the spring member 30 comprising a compression spring is connected to a first mount 310 at its first end 31 (which is the upper end when the spring member 30 is mounted in place to extend along the vertical direction), and to a second mount 320 at its second end 32 (the lower end when mounted in place). The first mount 310 is fixed for example onto the sidewall 81, the back wall, the front cover panel, or onto suitable placed intermediary retainers inside the vertical support structure 80, as explained earlier, to extend, perpendicular to the length of the vertical support structure 80, through the opening 21. The second mount 320 is fixed onto the sliding member 20 at a point below the mount 310. Alternatively, the first mount may be fixed onto the sliding member 20, and the second mount onto the sidewall 81, the back wall, the front cover panel, or onto the intermediary retainers. The sliding member 20 is then moved downwards a suitable length, for example 65 mm along the sliding element in the vertical direction B, to compress the compression spring in order to achieve a required spring load. The opening 21 has a length that allows the required movement of the sliding member. For example, the length of the opening 21 may be 100-200 mm.

In an embodiment, the spring member 30 comprising a tension spring is connected to a first mount 310 and to a second mount 320 from the first and second ends of the spring. The sliding member is moved a suitable length downwards in the vertical direction B to tension the tension spring in order to achieve a required spring load.

The length which the sliding member 20 may travel vertically along the length of the sidewall 81 may be 50-150 mm. The required spring load depends on the type of pipes, the pipe brackets 41 and the configuration of the pipe mount 1 itself, as explained above. The spring load must, in any case, be sufficient to create desired force acting in the desired direction.

It is also conceivable that no elastic member 30 is needed to achieve the above-mentioned connections, but the connecting of the different pipe sections may be done manually by simply moving the sliding member 20 along its sliding element as explained earlier, without the help of the spring load induced by a spring-loaded pipe mount 1.

When the plumbing arrangement element 8a has been mounted in place, and the required pipe connections between the first pipe section 60a and the connecting pipe 600 made, the connecting pipe 600 must be aligned to fit into the second fitting 61b of the second pipe section 60b. As the pipe mount is movable in the vertical direction B, the aligning may be done by moving the connecting pipe 600 from the extreme position to the second position, and maneuvering it in the correct alignment. Thus the pipe mount 1 may be at the same time loaded, in the case the pipe mount 1 is spring-loaded as explained above. Once the correct alignment has been achieved, the pipe mount 1 may be released to return to the extreme position (FIG. 2b), if it is of the spring-loaded type, or simply brought back to the extreme position manually, in order to form the final connection between connecting pipe 600 and the second pipe section 60b.

The released or manually operated pipe mount 1 pushes the pipe section 60a, fixed into the pipe mount 1, and the connecting pipe 600, joined to the first pipe section 60a at the first fitting 61a, upwards or downwards so that the connecting pipe 600 may be joined to the second pipe section 60a at the second fitting 61b. The upwards-directed or downwards-directed force (the upwards-directed force illustrated by arrow A in the embodiment of FIG. 2b), caused by the release of the spring load has to be high enough to enable the connection at the fitting 61b. At the same time, the horizontal top plane 630 of the insulation layer 63 is forced against the ceiling 170.

Once the required pipe connections have been achieved, the pipe mount 1 may be immovably fixed onto the sidewall 81 by securing the sliding member 20 to the sidewall 81 with a fastener 50 arranged at the bottom part 830 of the plumbing arrangement element 8a, where there is suitable space for the installing personnel to make the final fixing with an appropriate tool. The fastener 50 may for example comprise a threaded rod extending from the sidewall 81 through the opening 22 of the sliding member 20, and a nut that can be tightened to fix the pipe mount 1 in its final place. In an embodiment, the fastener 50 may comprise a set screw. In one embodiment, the fastener 50 may be a snap-in fastener such as a wedge with a retaining slot. In yet another embodiment, the fastener 50 may be chemical, such as an adhesive section equipped with a removable protecting strip that can be pulled off once the sliding member 20 is in its final placement. The opening 22 has a length that allows the required downwards movement of the sliding member 20 during its loading, similarly to the opening 21. For example the length of the opening 22 may be 100-150 mm.

Figure 3A:
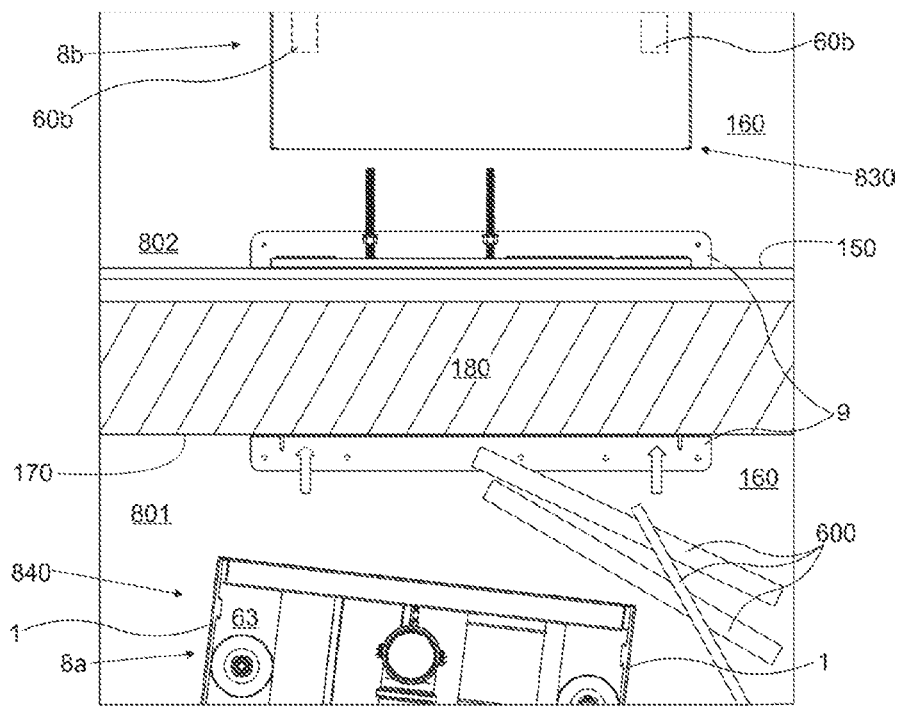
FIGS. 3a-d show installation steps of an exemplary embodiment of the present invention.

In the following, an embodiment of a method for connecting pipes in plumbing arrangement elements 8a, 8b is disclosed in reference to FIGS. 3a-d:

FIG. 3a shows a section of a second plumbing arrangement element 8b, already mounted in place to a wall 160 in a space 802 above a first space 801 where the first plumbing arrangement 8a is to be mounted. The second plumbing arrangement 8b has a number of second pipe sections 60b already arranged in their final installation. The second pipe sections 60b are similar pre-insulated pipes as their counterparts, the first pipe sections 61a, in the first plumbing arrangement element 8a.

Through the floor structure 180, required number of lead-through channels (not shown in FIGS. 3a-d, but can be seen in a schematic presentation in FIG. 2, denoted with the reference number 91) are arranged with a lead-through element 9. As the first plumbing arrangement element 8a is maneuvered in place, a required number of connecting pipes 600 are led through the lead-through element 9 and inserted into the first pipe sections 60a arranged into the first plumbing arrangement element 8a at the prefabrication stage. The connecting pipes 600 may be first trimmed approximately to a required length. A correct length allows the upper ends of the connecting pipe 600 to be inserted into the second fitting 61b of the second pipe section 60b to form a pipe connection, as the pipe mount 1 is in the uppermost position. Connections between the connecting pipes 600 and the first pipe sections 60a are achieved by pushing the connecting pipes 600 into the first fittings 61a arranged into of the pipe sections 60a, near or at the upper heads of the first pipe sections 60a, as explained earlier in this disclosure.

Figure 3B:
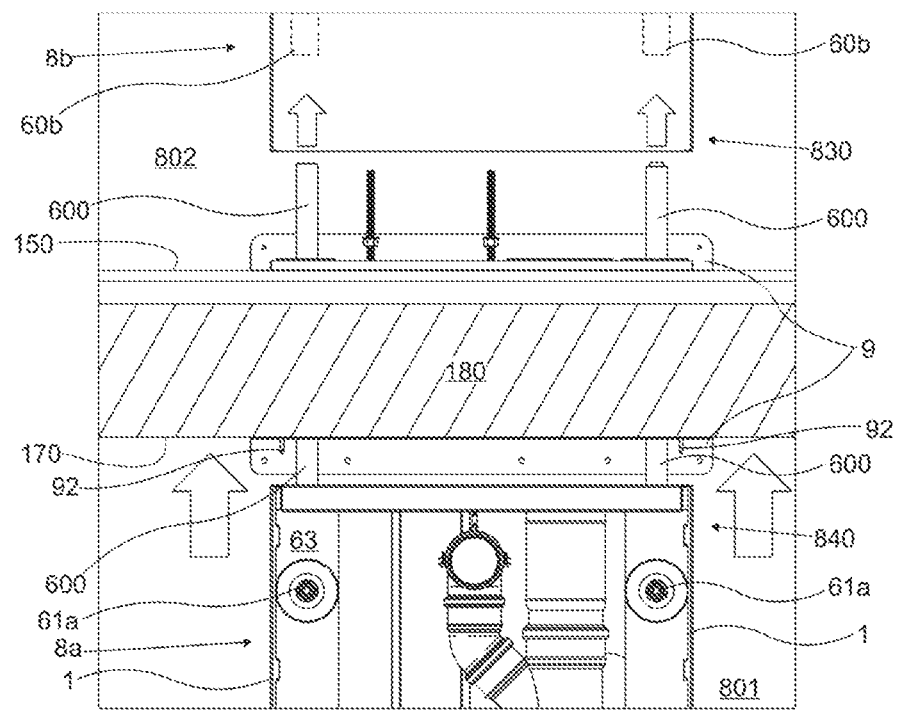

Once the required connections have been made, the first plumbing arrangement element 8a together with the pipelines formed by the pipe sections 60a and the connecting pipes 600 is lifted towards the ceiling 170 as shown in FIG. 3b. Connectors 70 fixed into the lead-through element 9 and arranged to extend downwards from it may be utilized in aligning and securing the first plumbing arrangement 8a in place against the ceiling 170. The first plumbing arrangement element 8a may be fastened to a wall mount (not shown) to finalize the mounting. At the same time as mounting the first plumbing arrangement element 8a in place, the connecting pipes 600 are inserted into the second fittings 61b of the second pipe sections 60b. At that instant, the pipe mount 1, at the uppermost position, forces the connecting pipe 600 into the second fitting 61b of the second pipe section 60b at a force sufficient to set off the connecting mechanism of the fitting 61b, as long as the connecting pipes 600 and the second pipe sections 60b are in line.

Figure 3C:
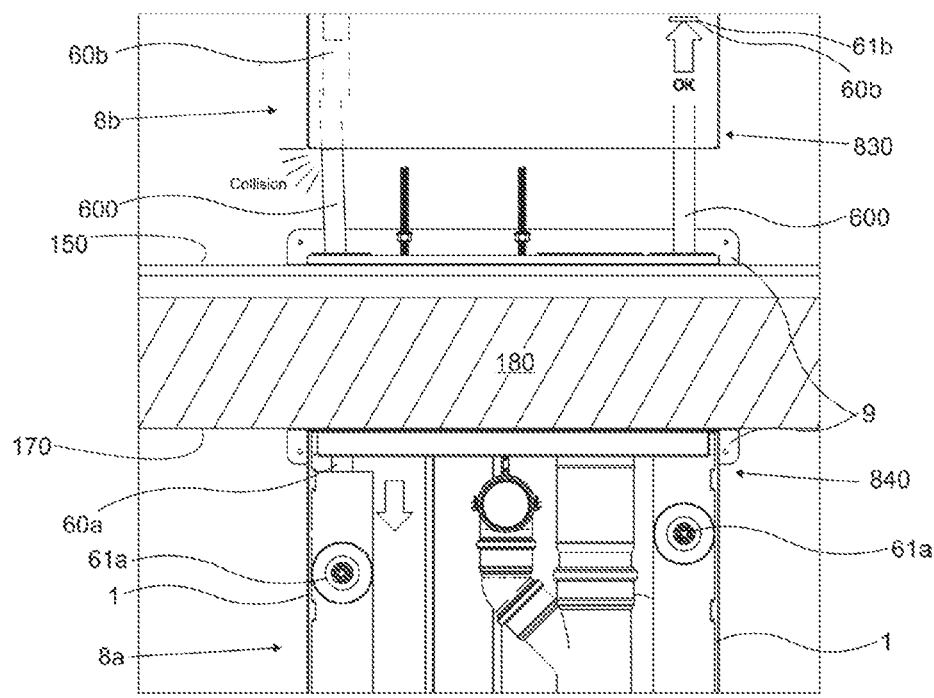
Figure 3D:
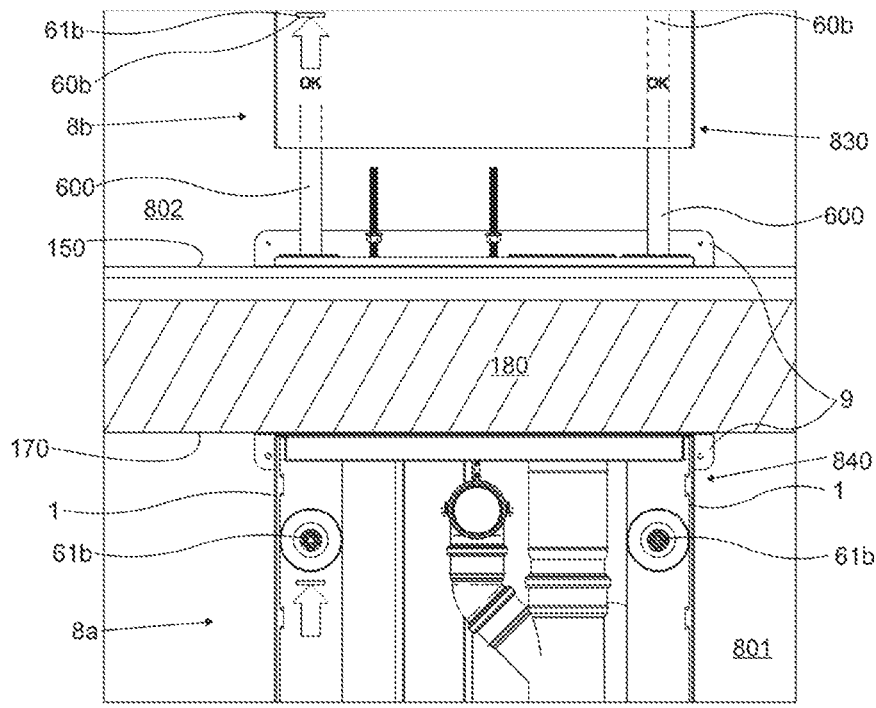

Once the first plumbing arrangement element 8a is mounted in place, it may turn out that one or more of the connecting pipes 600 are not aligned correctly to form connections with the second pipe sections 60b at the second fittings 61b, as can be seen in FIG. 3c, or the length of the pipeline formed by the pipe sections 60a and the connecting pipes 600 may not be exactly correct, to form the connections. At that event, the installing personnel may correct the alignment of those connecting pipes 600 by moving the pipeline formed by the first pipe sections 60a and the connecting pipes 600 along the vertical direction. At the same time, the connecting pipes 600 may be further trimmed to achieve a correct length. The pipe mount 1 allows the moving, as it can be slid downwards and/or upwards with the sliding member 20. For example, in an embodiment, the connecting pipes 600 joined to the first pipe sections 60a may be pushed downwards, the pushing action sliding the pipe mount 1 downwards from the extreme position. Then the connecting pipe 600 may be aligned into a correct alignment. At the same time, the pipe mount 1 may be moved downwards into a loaded position, in case the pipe mount 1 comprises elastic members 30.

Once a correct alignment of a connecting pipe 600 and a second pipe section 60b has been achieved (FIG. 3d), the pipe mount 1 can be released or brought manually back towards the extreme position which action forces the connecting pipe 600 into the second fitting 61b to form a secure connection between the connecting pipe 600 and the second pipe section 60b.

Thus, a continuous length of vertical pipeline has been achieved. At the same time of forcing the pipe sections 600, 60b together to form the required connections, also the horizontal top plane 630 of the insulation layer 63 of the first pipe section 60a is forced against ceiling 170. Consequently, only a short length of exposed connecting pipe 600 inside the lead-through channel 91 (FIG. 2) and at the bottom part 830 of the second plumbing arrangement element 8b must be insulated on site. Once all the required connections have been achieved, the pipe mount 1 can be fixed into place onto the sidewall 81 with a fastener 50 (not shown in FIGS. 3a-d) so that the finished pipelines may not be accidentally moved after the installation of the plumbing arrangement elements 8a, 8b has been completed.

In a plumbing system comprising first pipe sections 60a and a second plumbing system arrangement 8b disposed above the first plumbing arrangement element 8a comprising second pipe sections 60b connectable to the first pipe sections (0a of the first plumbing arrangement 8a with connecting pipes 600, the plumbing arrangement elements 8a, 8b may have any suitable number, one or more, of first and second pipe sections 60a, 60b. Naturally, the number of second pipe sections 60b corresponds to the number of first pipe sections 60a. The same number of connecting pipes 600 is needed. The number of lead-through channels 91 may be the same as the number of pipe sections 60a, 60b, or more than one pipelines comprising pipe sections 60a, 60b, 600 may be led through one single lead-through channel, depending on the installation configuration of the overall plumbing system. The plumbing system may further comprise a suitable number of pipe mounts 1 such as described in this disclosure for connecting the first pipe sections 60a to the second pipe sections 60b via connecting pipes 600. Further, in the plumbing system the plumbing arrangement elements 8a, 8b may be prefabricated elements as described in this disclosure.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A pipe mount for connecting a first vertical pipe section of a first plumbing arrangement element to a second vertical pipe section of a second plumbing arrangement element to form a continuous vertical pipeline, the first plumbing arrangement element and the second plumbing arrangement element constituting a plumbing arrangement, the pipe mount arranged inside the plumbing arrangement, wherein the pipe mount comprises a sliding member configured to be movably attached to the plumbing arrangement, the sliding member configured to extend in the vertical direction of the plumbing arrangement, and the sliding member configured to be vertically movable between an extreme position and a second position; and at least one pipe bracket extending horizontally from the sliding member, the at least one pipe bracket configured to secure the first vertical pipe section onto the sliding member, the first vertical pipe section configured to extend vertically from a bottom part of the first plumbing arrangement element to a top part of the first plumbing arranged element, wherein the pipe mount further comprises at least one elastic member configured to load the pipe mount when vertically moving the sliding member from the extreme position to the second position.

2. The pipe mount according to claim 1, wherein the elastic element is a spring selected from a group comprising a tension spring, and a compression spring.

3. The pipe mount according to claim 1, wherein the first pipe section comprises at least one first fitting.

4. The pipe mount according to claim 3, wherein a connecting pipe is configured to be connected to the first pipe section via the first fitting.

5. The pipe mount according to claim 3, wherein the second pipe section comprises at least one second fitting.

6. The pipe mount according to claim 5, wherein the connecting pipe is configured to be connected to the second pipe section via the second fitting so that a continuous vertical pipeline comprising the first pipe section, the connecting pipe and the second pipe section, is formed.

7. The pipe mount according to claim 5, wherein the first fitting and the second fitting are configured to be at least partially embedded into the insulation layer.

8. The pipe mount according to claim 1, wherein the first pipe section and the second pipe section comprise pre-insulated pipe with an insulation layer.

9. The pipe mount according to claim 8, wherein the at least one pipe bracket is configured to be at least partially embedded into the insulation layer.

10. The pipe mount according to claim 1, wherein the sliding member is configured to be immovably securable onto the plumbing arrangement with a fastener.

11. The pipe mount according to claim 1, wherein the first pipe section comprises at least one first fitting.

12. The pipe mount according to claim 1, wherein the second pipe section comprises at least one second fitting.

13. The pipe mount according to claim 1, wherein the first pipe section and the second pipe section comprise pre-insulated pipe with an insulation layer.

14. A plumbing system, comprising a first plumbing arrangement element comprising first pipe sections and a second plumbing system arrangement disposed above the first plumbing arrangement element comprising second pipe sections connectable to the first pipe sections of the first plumbing arrangement with connecting pipes, wherein at least the first plumbing arrangement element comprises at least one pipe mount according to claim 1 for connecting the first pipe sections to the second pipe sections.

15. The system according to claim 14, wherein the first plumbing arrangement element and the second plumbing arrangement element are prefabricated elements.

* * * * *